US010445376B2

(12) United States Patent
Azimi et al.

(10) Patent No.: US 10,445,376 B2
(45) Date of Patent: Oct. 15, 2019

(54) REWRITING KEYWORD INFORMATION USING SEARCH ENGINE RESULTS

(71) Applicant: Microsoft Technology Licensing, LLC, Redmond, WA (US)

(72) Inventors: Javad Azimi, Palo Alto, CA (US); Ruofei Zhang, Mountain View, CA (US); Muhammad Adnan Alam, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1016 days.

(21) Appl. No.: 14/852,457

(22) Filed: Sep. 11, 2015

(65) Prior Publication Data

US 2017/0075996 A1    Mar. 16, 2017

(51) Int. Cl.
| | |
|---|---|
| *G06F 16/951* | (2019.01) |
| *G06F 17/27* | (2006.01) |
| *G06F 16/33* | (2019.01) |
| *G06F 16/335* | (2019.01) |
| *G06N 3/08* | (2006.01) |

(52) U.S. Cl.
CPC .......... *G06F 16/951* (2019.01); *G06F 16/334* (2019.01); *G06F 16/335* (2019.01); *G06F 17/277* (2013.01); *G06N 3/084* (2013.01)

(58) Field of Classification Search
CPC ...... G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS

| | | | |
|---|---|---|---|
| 7,043,450 B2 | 5/2006 | Velez et al. | |
| 7,519,588 B2 | 4/2009 | Mason | |
| 7,617,176 B2* | 11/2009 | Zeng ..................... | G06F 16/951 |
| 7,752,200 B2 | 7/2010 | Scholl et al. | |
| 8,078,557 B1 | 12/2011 | Ershov | |
| 8,341,047 B1* | 12/2012 | Fumey ............... | G06Q 30/0241 |
| | | | 705/14.49 |
| 8,583,672 B1* | 11/2013 | Paskin .................. | G06F 16/951 |
| | | | 707/765 |

(Continued)

OTHER PUBLICATIONS

Huang et al.—Learning Deep Structured Semantic Models for Web Search using Clickthrough Data—2013—https://posenhuang.github.io/papers/cikm2013_DSSM_fullversion.pdf (Year: 2013).*

(Continued)

*Primary Examiner* — Scott A. Waldron
*Assistant Examiner* — Viker A Lamardo
(74) *Attorney, Agent, or Firm* — Rainier Patents, P.S.

(57) ABSTRACT

A computer-implemented technique is described herein for modifying original keyword information to increase the probability that it will match the queries input by users. The technique operates by using a search engine to provide supplemental information that is relevant to the original keyword information. The technique then mines the supplemental information to extract frequently-occurring n-grams. Next, the technique removes n-grams that are considered to represent noise, and then uses a deep-structured machine-learned model to assign score values to the remaining n-grams. Finally, the technique supplements and/or replaces the original keyword information with the highest-scoring n-grams.

20 Claims, 10 Drawing Sheets

(56) References Cited

U.S. PATENT DOCUMENTS

| | | | |
|---|---|---|---|
| 8,700,599 | B2 | 4/2014 | Udupa et al. |
| 8,768,922 | B2 | 7/2014 | Crane et al. |
| 2002/0194166 | A1 | 12/2002 | Fowler |
| 2005/0080772 | A1* | 4/2005 | Bem ................... G06F 16/951 |
| 2007/0078828 | A1* | 4/2007 | Parikh ................ G06F 16/9535 |
| 2007/0299815 | A1* | 12/2007 | Starbuck ............ G06F 16/3326 |
| 2009/0248669 | A1* | 10/2009 | Shetti ................. G06F 16/3322 |
| 2011/0258054 | A1* | 10/2011 | Pandey .............. G06F 17/2795 705/14.72 |
| 2011/0264507 | A1 | 10/2011 | Zhou et al. |
| 2011/0313845 | A1* | 12/2011 | Richardson ........ G06Q 30/0243 705/14.42 |
| 2013/0151538 | A1* | 6/2013 | Dmitriev ............ G06F 16/3346 707/750 |
| 2014/0046756 | A1* | 2/2014 | Wang ................. G06Q 30/0251 705/14.45 |
| 2015/0012560 | A1* | 1/2015 | Franosch ........... G06F 16/3322 707/769 |
| 2015/0074027 | A1 | 3/2015 | Huang et al. |
| 2015/0278285 | A1* | 10/2015 | Meng ................. G06F 16/2365 707/690 |
| 2018/0108050 | A1* | 4/2018 | Halstvedt ........... G06F 17/2775 |

OTHER PUBLICATIONS

Bespalov et al.—Sentiment Classification Based on Supervised Latent n-gram Analysis—2011—http://citeseerx.ist.psu.edu/viewdoc/download?doi=10.1.1.214.1605&rep=rep1&type=pdf (Year: 2011).*

Lebret et al.—N-gram-based Low-dimensional Representation For Document Classification—2015—https://arxiv.org/pdf/1412.6277.pdf (Year: 2015).*

Chen et al.—Improving Query Spelling Correction Using Web Search Results—2007—http://www.aclweb.org/anthology/D07-1019 (Year: 2007).*

Buckley et al.—Automatic Query Expansion Using SMART TREC 3—1994—https://www.semanticscholar.org/paper/Automatic-Query-Expansion-Using-SMART%3A-TREC-3-Buckley-Salton/7859071375af210096a2003f355df17817297173 (Year: 1994).*

Velez et al.—Fast and effective query refinement—1997—https://dl.acm.org/citation.cfm?id=258528 (Year: 1997).*

Mitra et al.—Improving automatic query expansion—1998—https://dl.acm.org/citation.cfm?id=290995 (Year: 1998).*

Sahami et al.—A web-based kernel function for measuring the similarity of short text snippets—2006—https://dl.acm.org/citation.cfm?id=1135834 (Year: 2006).*

Bollegala et al.—Measuring Semantic Similarity between Words Using Web—2007—http://www.wwwconference.org/www2007/papers/paper632.pdf (Year: 2007).*

Zhang, et al., "Bid keyword suggestion in sponsored search based on competitiveness and relevance," in Information Processing and Management, vol. 50, No. 4, Jul. 2014, 16 pages.

Li, et al., "Keyword Extraction for Social Snippets," in Proceedings of 19th International Conference on World Wide Web, Apr. 2010, 2 pages.

Belzile, Pierre, "Using Query Rewriting in Search Advertising Applications," available at <<http://www.idilia.com/using-query-rewriting-in-search-advertising/>>, Idilia Inc., published on Dec. 15, 2012, 3 pages.

Malekian, et al., "Optimizing Query Rewrites for Keyword-Based Advertising," in Proceedings of 9th ACM Conference on Electronic Commerce, Jul. 2008, 12 pages.

Gupta, et al., "Catching the Drift: Learning Broad Matches from Clickthrough Data," in Proceedings of 15th ACM SIGKDD International Conference on Knowledge Discovery and Data Mining, Jun. 2009, 9 pages.

Yih, et al., "Similarity Models for Ad Relevance Measures," in Proceedings of NIPS Workshop: Machine Learning in Online Advertising, Dec. 2010, 7 pages.

Broder, et al., "Online Expansion of Rare Queries for Sponsored Search," in Proceedings of 18th International Conference on World Wide Web, Apr. 2009, 10 pages.

Dave, et al., "Pattern Based Keyword Extraction for Contextual Advertising," in Proceedings of 19th ACM International Conference on Information and Knowledge Management, Oct. 2010, 4 pages.

Huang, et al., "Learning Deep Structured Semantic Models for Web Search using Clickthrough Data," in Proceedings of 22nd ACM International Conference on Information & Knowledge Management, Oct. 2013, 6 pages.

Kiritchenko, et al., "Keyword Optimization in Sponsored Search via Feature Selection," in Journal of Machine Learning and Research Workshop and Conference, vol. 4, Jun. 2008, 13 pages.

Guo, et al., "Context-Sensitive Search Using a Deep Learning Model," U.S. Appl. No. 14/252,703, filed Apr. 14, 2014, 58 pages.

* cited by examiner

KEYWORD INFORMATION: Acme X2Router

⇩ ← 302

Acme Co. Dual Band Wireless Router [URL] The Acme X2Router is the best wireless router available for the money. It has a bandwidth of 2.0 Gbps. You can connect your . . .

Wireless Router by XYZ Co. [URL]. XYZ Co.'s offers a new dual band wireless router . It supports 802.11 and WPA wireless security. Some prefer the comparable X2Router version produced by Acme Co., . . .

Comparison of Routers [URL]. Both Acme Co. and XYZ Co. make dual band wireless routers . The Acme X2Router has its fans, but the Z-5 produced by XYZ Co. offers slightly more bandwidth . . .

•
•
•

⇩

HIGH-FREQUENCY N-GRAMS:
Wireless Router,
Dual Band Wireless Router,
Acme Wireless Router
•
•
•

| Illustrative User Interface | □ □ □ |

Input Keyword  [ Acme X2Router ] } 404   Search 🔍

Projected Performance: 200 imp/wk; 20 clicks/wk } 406

You Might Alternatively Use: dual band wireless router } 408
(click to choose)

Projected Performance: 5000 imp/wk; 700 clicks/wk } 410

FIG. 4

REWRITING KEYWORD INFORMATION USING SEARCH ENGINE RESULTS

BACKGROUND

A search engine typically matches a user's query against a collection of target items (e.g., ads, web pages, etc.) by comparing the tokens of the query with the tokens associated with individual target items. The search engine then delivers one or more target items (if any) that have instances of keyword information that most closely match the query, based on any environment-specific matching criteria. In some scenarios, the target items correspond to ads having bidded keyword information associated therewith.

Many times, however, the keyword information associated with a target item is poorly chosen. As a result, the search engine may not be successful in matching many (or any) users' queries against the keyword information. As a further result, the search engine may not identify many (or any) relevant target items. The user (who performs a search) is thereby disadvantaged because the user may be deluged with potentially irrelevant target items, to varying degrees. The user may also need to extend the length of his or her search session in hopes of finding useful target items. The search engine is disadvantaged because it wastes communication and processing resources in responding to the user in the course of the extended search session. Finally, in advertising-related context, both advertisers and the entity which administers the search engine are disadvantaged because revenue is lost through the inefficient placement of the target items.

SUMMARY

A computer-implemented technique is described herein for modifying original keyword information to increase the probability that it will match the queries input by users. The technique operates by using a search engine to provide supplemental information that is relevant to the original keyword information. The technique then mines the supplemental information to extract frequently-occurring n-grams. Next, the technique removes n-grams that are considered to represent noise, and then uses a deep-structured machine-learned model to assign score values to the remaining n-grams. Finally, the technique supplements and/or replaces the original keyword information with the highest-scoring n-grams.

The technique provides positive user experience because it allows a user to retrieve relevant target items in an expedited manner. In so doing, the technique also makes efficient use of the computing resources used to implement the technique. The technique may increase the profit of advertisers (who enjoy improved placement of ads) and the entity which administers the technique (which may receive increased revenue from the advertisers based on the improved placement of ads).

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 shows an example of supplemental information that the system (of FIG. 1) mines for relevant n-grams.

FIG. 4 shows one user interface presentation that the system (of FIG. 1) can present to a user for the purpose of suggesting alternative keyword information (compared to the original keyword information specified by the user).

Figure 1:
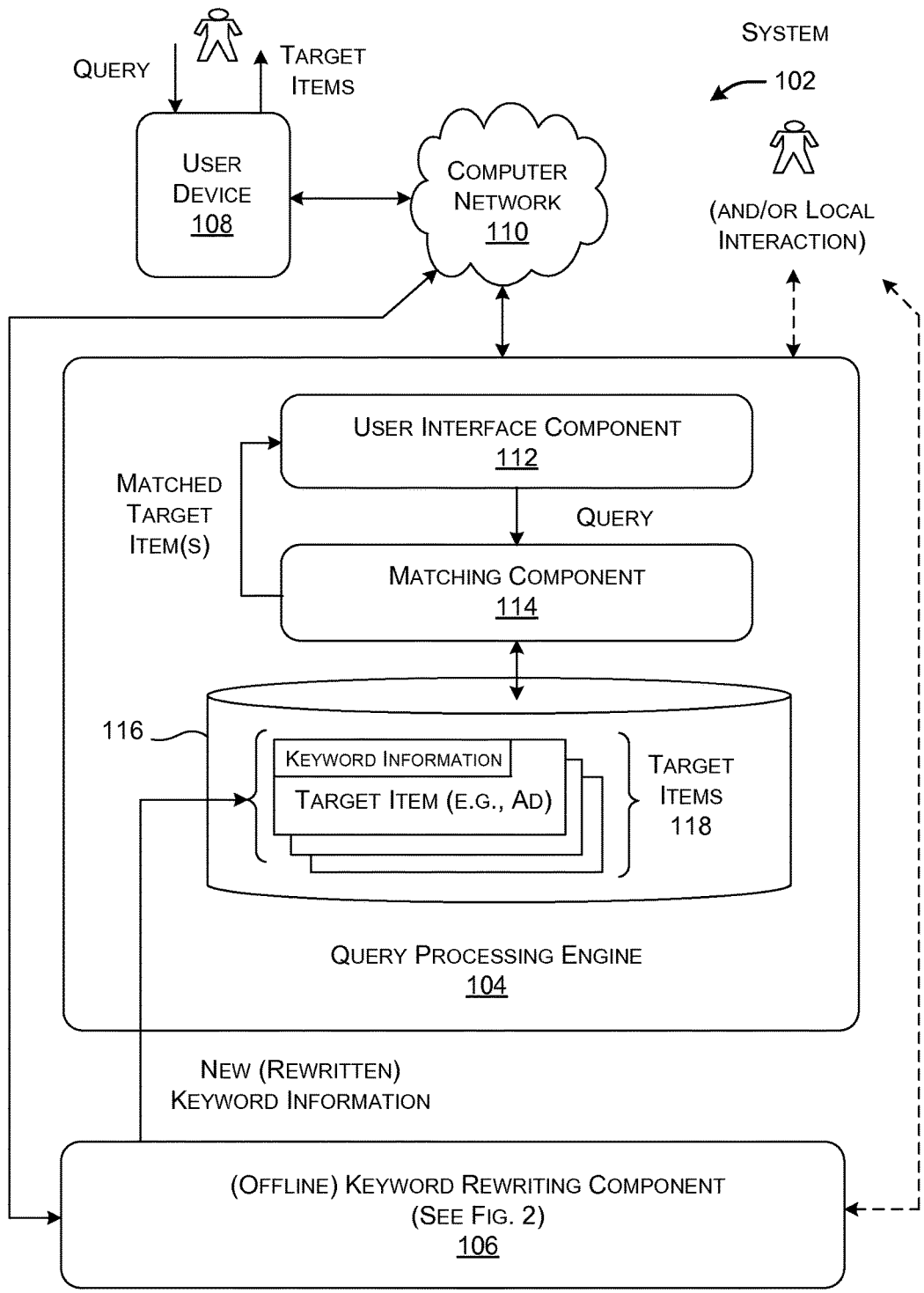
FIG. 1 shows an overview of a system for rewriting keyword information.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for rewriting keyword information. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. The various components shown in the figures can be implemented by various physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by various physical and tangible mechanisms, for instance, by software running on computer equipment, hardware (e.g., chip-implemented logic functionality), etc., and/or any combination thereof.

As to terminology, the phrase "configured to" encompasses various ways that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses various instances of physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A.1. Illustrative System

FIG. 1 shows a system 102 that includes a query processing engine 104 for receiving a query from a user. The query includes a set of original tokens. For example, the tokens may correspond to words, phrases, numbers, etc. in the original query. The query processing engine 104 then finds one or more target items (if any) which match the candidate queries, based on any matching criteria. For instance, in one case, the target items correspond to ads. Each ad has bidded keyword information associated therewith, made up of one or more tokens. The query processing engine 104 matches a query to an ad's keyword information by matching the tokens in the candidate query with the tokens in the ad's keyword information, based on any matching criteria.

A keyword rewriting component 106 may operate in an offline (and/or online) manner to rewrite instances of bidded keyword information associated with certain target items. The keyword rewriting component 106 can operate in at least two modes. In a first mode, the keyword rewriting component 106 detects underperforming target items and the instances of keyword information associated therewith. The keyword rewriting component 106 then rewrites the instances of keyword information associated with these ads, with the ultimate objective of improving the ability of the query processing engine 104 to match the users' queries to the ads.

In a second mode of operation, an advertiser (or any other user) can input a proposed instance of keyword information associated with a target item to the keyword rewriting component 106. In response, the keyword rewriting component 106 can identify the projected performance of the proposed keyword information. The keyword rewriting component 106 can also present one or more alternative instances of keyword information to the advertiser, each of which has better performance than the initially proposed keyword information. The advertiser may then opt to choose one or more of the alternative instances of keyword information, instead of the initially proposed keyword information.

The keyword rewriting component 106 can also be applied to different environments besides the above-described ad presentation environment. For example, the keyword rewriting component 106 may be use to improve other types of searches. For instance, consider the case in which a corpus of content items has instances of metadata information associated therewith. The content items may correspond to images, videos, documents, web pages, etc. Each instance of metadata information may include one or more keywords. In this context, the keyword rewriting component 106 can rewrite the instances of metadata information to increase the probability that a user's search will match one or more content items. In yet another case, the keyword rewriting component 106 can be used in real time to modify the keywords in a user's input query. Still other applications are possible. However, to facilitate and simplify the description, the following explanation will be framed principally in the context in which the query processing engine 104 operates by matching queries against bidded keyword information associated with ads.

The system 102 of FIG. 1 provides one or more benefits. For instance, the keyword information associated with a target item (e.g., an ad) may be relatively obscure or otherwise poorly descriptive of the product or service to which it pertains. This can potentially result in the query processing engine 104 failing to provide the most relevant target items to the user. As a result, the user may be given less-than-optimally relevant ads. The user may also feel compelled to extend his or her search session to uncover more relevant target items. This results in a poor user experience. It also potentially wastes the communication and processing resources associated with the query processing engine 104. The system 102 addresses this problem by improving the probability that the user will be served relevant target items in an expeditious manner. Such a characteristic improves user experience and also potentially results in the more efficient use of the resources of the query processing engine 104.

Finally, the system 102 may also increase the profitability of both advertisers and whatever entity administers the query processing engine 104. The advertisers benefit because they may sell more products and services through the improved placement of their ads. The entity which administers the query processing engine 104 benefits because an increased impression rate and/or click-through rate may increase the fees paid by the advertisers to the entity. An "impression" refers to an occasion in which the query processing engine 104 presents an ad to a user for the user's consideration. A "click" refers to an occasion in which a user clicks on or otherwise selects an ad that is presented to him or her.

With the above introduction, FIG. 1 will now be described. In one case, the query processing engine 104 represents a computer-implemented system that includes one or more servers and other associated computing equipment (e.g., routers, load balancers, etc.). The computer-implemented system may be provided at a single site or may be distributed over plural sites. Likewise, the keyword rewriting component 106 may represent a computer-implemented system that includes one or more servers and other associated computing equipment.

In one case, the query processing engine 104 and the keyword rewriting component 106 represent two respective systems that may be administered by the same entity or different respective entities. In another case, the query processing engine 104 and the keyword rewriting component 106 may represent parts of a single system.

A user may interact with the query processing engine 104 and/or the keyword rewriting component 106 via a user device 108 of any type, via a computer network 110. For example, without limitation, the user device 108 may represent any of a desktop personal computing device, a laptop computing device, a game console device, a set-top box, a tablet-type computing device, a smartphone, a wearable computing device, and so on. The computer network 110 may represent a local area network, a wide area network (e.g., the Internet), one or more point-to-point communication links, or any combination thereof.

The user device 108 may specifically access the services of the query processing engine 104 by connecting to a network address associated with the query processing engine 104. Similarly, the user device 108 may access the services of the keyword rewriting component 106 by connecting to another network address associated with the keyword rewriting component 106. Note that FIG. 1 only shows a single user device 108, but any number of users may use respective user devices to interact with the query processing engine 104.

Further note that FIG. 1 shows an implementation in which the system 102 performs all processing on a user's query at the network-accessible query processing engine 104. But in other cases, the system 102 can distribute any these tasks between each user device and the query processing engine 104. Similarly, the system 102 performs all rewriting of the keyword information at the keyword rewriting component 106. But in other cases, the system 102 can allocate certain keyword rewriting tasks, in whole or in part, to the user devices.

In yet another scenario, the query processing engine 104 represents a standalone application implemented by any user device. Here, the user may directly interact with the query processing engine 104 without necessarily communicating over the computer network 110. Similarly, the keyword rewriting component 106 may represent a standalone application implemented by any user device.

The query processing engine 104 may include a user interface component 112. The user interface component 112 provides user interface functionality by which each user may interact with the query processing engine 104. For example, the user interface component 112 can provide a user interface presentation by which a user may submit an original query. The user interface component 112 may also provide one or more user interface presentations by which the query processing engine 104 may provide matching target items to the user. In one implementation, the user device 108 may interact with these user interface presentations via a browser application, such as INTERNET EXPLORER, provided by MICROSOFT CORPORATION of Redmond, Wash.

A matching component 114 compares each input query with a collection of target items. In one scenario, for instance, the matching component 114 compares each input query with instances of bidded keyword information associated with a plurality of ads. The matching component 114 can then identify one or more instances of keyword information (and corresponding ads) that most closely match the candidate query, based on any matching criterion. The user interface component 112 may then send the user the identified ad(s).

A data store 116 stores a collection of target items 118. In one case, the data store 116 represents a single data store provided at a single physical location. In other cases, the data store 116 represents an underlying plurality of data stores, provided at a single location or distributed over a plurality of different locations. Indeed, the data store 116 may represent different storage sites coupled together via the Internet.

Figure 2:
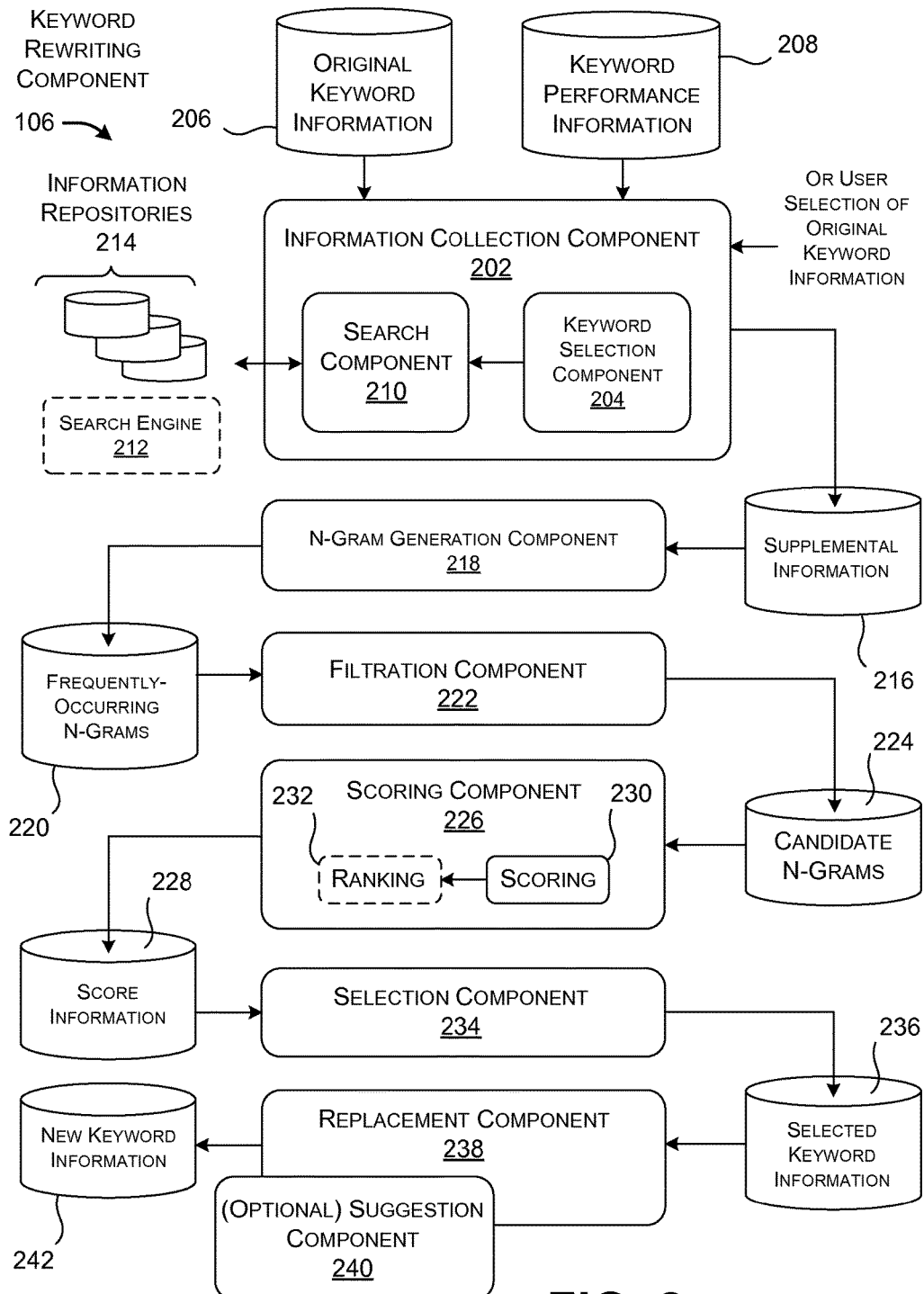
FIG. 2 shows one implementation of a keyword rewriting component, which is a part of the system of FIG. 1.

FIG. 2 shows one implementation of the keyword rewriting component 106 of FIG. 1, which will be described below in generally top-to-bottom manner. An information collection component 202 operates to generate supplemental information for each instance of keyword information under consideration. In one mode of operation, a keyword selection component 204 automatically chooses one or more instances of keyword information to be rewritten. To perform this task, the keyword selection component 204 may consult a data store 206 that identifies existing instances of keyword information, together with a data store 208 that provides keyword performance information. For example, each instance of the keyword information in the data store 206 may identify bidded keywords registered by an advertiser, and the target item (e.g., ad) associated therewith. Each instance of the keyword performance information provides various performance measures for a target item, such as a number of impressions, a click-through rate, etc., or any combination thereof. Based on this information, the keyword selection component 204 can select one or more of the worst performing target items, e.g., by retrieving the performance measures for each instance of keyword information specified in the data store 206, and then identifying the subset of instances of keyword information (and associated target items) having the worst performance measures. The poor performance of these target items may indicate that their corresponding instances of keyword information are not adequately descriptive of the products or services to which the target items pertain.

In a second mode of operation, the keyword selection component 204 can receive a user's manual selection of one or more instances of keyword information to be rewritten. For instance, an advertiser may interact with the keyword selection component 204 to investigate the performance of a proposed instance of keyword information, and to determine whether there are more effective instances of keyword information that can be chosen (besides the proposed instance of keyword information).

To facilitate explanation, FIG. 2 will henceforth be explained in the context of processing performed for a single instance of keyword information, associated with a single target item. The keyword rewriting component 106 can perform the same processing on any number of instances of keyword information, e.g., in a parallel and/or serial fashion. For example, the keyword rewriting component 106 can rewrite a batch of instances of keyword information, associated with a corresponding batch of the most poorly performing ads.

Next, a search component 210 performs a search on the basis of the instance of keyword information to be rewritten, to generate supplemental information. More specifically, the search component 210 formulates a query based on the keyword information (e.g., such that the query terms include the keyword information), and then submits that query to a search engine 212, such as the BING search engine provided by MICROSOFT CORPORATION of Redmond, Wash. The search engine 212 matches the query against an index of network-accessible items. Those network-accessible items are stored in one or more information repositories 214. For example, the information repositories 214 may represent storage resources provided by a wide area network, such as the Internet. The search engine 212 then generates search result information that summarizes the results of its search, and returns that information to the search component 210. For example, the search engine 212 may return a page of search result snippets. Each snippet identifies a matching network-accessible item, e.g., by providing a network-accessible address associated with the item, a title associated with the item, and a brief summary of the content of the item.

Upon receipt of the search result information, the search component 210 can formulate supplemental information for the keyword information. For example, the search component 210 can select the top-ranking n search result hits from the search result information returned by the search engine 212 to produce the supplemental information. The search component 210 stores the supplemental information in a data store 216.

Next, an n-gram generation component 218 generates n-grams on the basis of the supplemental information provided in the data store 216. An n-gram corresponds to a series of n word that appear together in the supplemental information. For example, consider the search result snippet description, "The Acme X2Router is the best wireless router available for the money." The n-gram generation component 218 may form n-grams of length two corresponding to "The Acme," "Acme X2Router," "X2Router is," etc. The n-gram generation component 218 may form n-grams of length three corresponding to "The Acme X2Router," "Acme X2Router is," etc. (Alternatively, the n-gram generation component 218 can ignore certain stop words when computing n-grams, such as "the" and "a," etc.) In one case, the n-gram generation component 218 can generate all such n-grams, where $2 \leq n \leq z$, where z reflects an environment-specific maximum n-gram length (such as, without limitation, 4).

The n-gram generation component 218 also keeps a running tally of the frequency of each n-gram that it encounters. When finished, the n-gram generation component 218 can retain only those n-grams that pass a frequency threshold test. That frequency threshold test compares each n-gram to a frequency threshold value, where that threshold value depends on both the number of tokens in the n-gram under consideration, and the number of tokens in the particular instance of keyword information under consideration. For example, consider an instance of bidded keyword information having five or less tokens. A candidate n-gram having two tokens will be retained if there are 8 or more occurrences of this n-gram in the supplemental information. A candidate n-gram having three tokens will be retained if there are 6 or more occurrences of this n-gram in the supplemental information. A candidate n-gram of four tokens will be retained if there are 5 or more occurrences of this n-gram in the supplemental information, and so on. These threshold values increase in a linear manner with respect to the length of the bidded keyword information. The n-gram generation component 218 stores all of the n-grams that satisfy the above-described frequency threshold test in a data store 220. These n-grams constitute frequently-occurring n-grams, in the terminology used herein.

A filtration component 222 next removes a subset of n-grams (if any) that are determined to represent noise. In one implementation, the filtration component 222 first identifies combinations of tokens that typically appear together in a corpus, in a predetermined order. Each such combination is referred to herein as consistent combination. For example, the phrase "New York" contains two tokens that almost always appear together in a particular order, e.g., with "York" following "New"; that pairing therefore constitutes a consistent combination. As in the case of "New York," many consistent combinations correspond to entity names. But other consistent combinations are not entity names. After identifying a collection of consistent combinations, the filtration component 222 can remove any frequently-occurring n-gram that breaks a consistent combination. For example, if the supplemental information contains a phrase "New York ranks among the top states," the filtration component 222 can remove the n-gram "York ranks," as it breaks the consistent combination "New York," and is therefore likely to be an unrealistic n-gram. In other words, "York ranks" represents noise.

The filtration component 222 can identify consistent combinations in different ways. For example, the filtration component 222 can consult a dictionary that identifies a corpus of consistent combinations (e.g., entity names). In addition, or alternatively, the filtration component 222 can use a machine-learned and/or rules-based system to identify the presence of consistent combinations (e.g., entity names). In addition, or alternatively, the filtration component 222 can examine the supplemental information itself to identify consistent combinations. For instance, in one implementation, the filtration component 222 can identify a series of tokens as a consistent combination if: 1) the series of tokens appears in more than a prescribed percentage (e.g., 80%) of the search result snippets in the supplemental information; and 2) the tokens appear in the same order within the search result snippets, in a prescribed percentage of cases. The last-mentioned method of detecting consistent combinations is customized with respect to the instance of keyword under consideration, since the corpus that is mined for consistent combinations is generated on the basis of the keyword information. Finally, the filtration component 222 stores whatever n-grams pass the filtration test in a data store 224. These n-grams are referred to herein as candidate n-grams.

Next, a scoring component 226 assigns a score value to each candidate n-gram in the data store 228. The score value reflects the semantic similarity between the candidate n-gram and the bidded keyword information. In one approach, the scoring component 226 is implemented as a machine-learned deep-structured model. Subsection A.2 (below) provides additional information regarding one implementation of the scoring component 226. However, other implementations of the scoring component 226 can use other types of machine-learned models.

The scoring component 226 stores the score values that it generates in a data store 228. The score values are associated with respective candidate n-grams, referred to at this juncture as scored n-grams. As a whole, the scored n-grams constitute score information.

In another implementation, the selection component 226 can be implemented by some type of engine other than, or in addition to, a machine-learned model, such as a rules-based engine, any manually derived algorithm or equation, and so on.

In another implementation, the scoring component 226 can be implemented as a staged model having two or more sub-components. For example, the scoring component 226 may include a scoring sub-component 230 that uses a machine-learned model (such as a machine-learned deep-structured model) which produces a preliminary score value for a candidate n-gram in the same manner described above (and also described in greater detail in Subsection A.2). The scoring component 226 also includes a "downstream" ranking sub-component 232 that determines a final score value for the candidate n-gram based, in part, on the preliminary score value provided by the preceding scoring sub-component 230. In other words, the ranking sub-component 232 treats the preliminary score value that is fed to it as a feature value, which it considers together with one or more other feature values pertaining to the candidate n-gram, the original keyword information, etc. The optional ranking sub-component 232 can itself be implemented as a machine-learned model, an algorithm, an equation, a rules-based system, etc.

A selection component 234 selected zero, one or more of the scored n-grams based on their respective score values (and/or any other consideration(s)). For example, the selection component 234 can select those scored n-grams having score values over a prescribed score threshold value. Alternatively, the selection component 234 can select the top k scored n-grams, without reference to a threshold value. The selection component 234 can then store the selected candidate n-grams in a data store 236. The selected candidate n-grams can be generally regarded as selected keyword information.

Next, a replacement component 238 replaces and/or supplements the original bidded keyword information with the selected keyword information. For example, the replacement component 238 can automatically replace the poorly performing keyword information associated with an ad with the selected keyword information. In other cases, a suggestion component 240 may present the selected keyword information to a user (e.g., an advertiser) for his or her manual consideration. If the user accepts the selected keyword information, then the replacement component 238 can replace and/or supplement the original keyword information with the selected keyword information. In any case, the replacement component 238 stores new keyword information in a data store 242. The new keyword information represents just the selected keyword information, or the selected keyword information in conjunction with the original keyword information. The query processing engine 104 henceforth matches input queries against the new keyword information.

FIG. 3 shows an example of the operation of the keyword rewriting component 106 described in FIG. 2. Assume here that the original keyword information corresponds to the phrase "Acme X2Router." The advertiser may have created this keyword information because it corresponds to the market name of one of its products. But assume that this keyword information is unknown to users or otherwise unpopular; if so, only a few users can be expected to use the phrase "Acme X2Router" when attempting to find the type of product to which this phrase corresponds. If this is true, the original keyword information can be expected to perform poorly in surfacing ads to users who perform searches.

The search component 210 submits the phrase "X2Router" to the search engine 212 as a query. In response, it receives supplemental information 302, which constitutes a certain number of top-ranking search result snippets. Many of the search result snippets contain the phrase X2Router. In addition, many of the search result snippets contain other frequently occurring n-grams, such as "dual band wireless router." Hence, the n-gram generation component 218 can identify at least the frequently-occurring n-gram "dual band wireless router" as a possible replacement for the original keyword information, "Acme X2Router." The filtration component 222 can also rule out certain n-grams that break consistent combinations. For example, assume that the filtration component 222 determines that the term "hot spot" represents a consistent combination. The filtration component will then cull out n-grams that break this combination.

FIG. 4 shows a user interface presentation 402 provided by the system 102, by which an advertiser (or any other user) may interact with the keyword rewriting component 106. In this example, the advertiser inputs the original keyword information "Acme X2Router" into an entry box 404 of the user interface presentation 402. The keyword rewriting component 106 responds by computing the projected performance of the specified keyword information, and displaying it in a display field 406. The keyword rewriting component 106 can also display at least one alternative instance of keyword information in display field 408, together with the projected performance of that keyword information in the display field 410. Upon learning that the alternative keyword information is projected to perform much better than the originally proposed keyword information, the advertiser may decide to choose the alternative keyword information.

A.2. Illustrative Scoring Component

Figure 5:
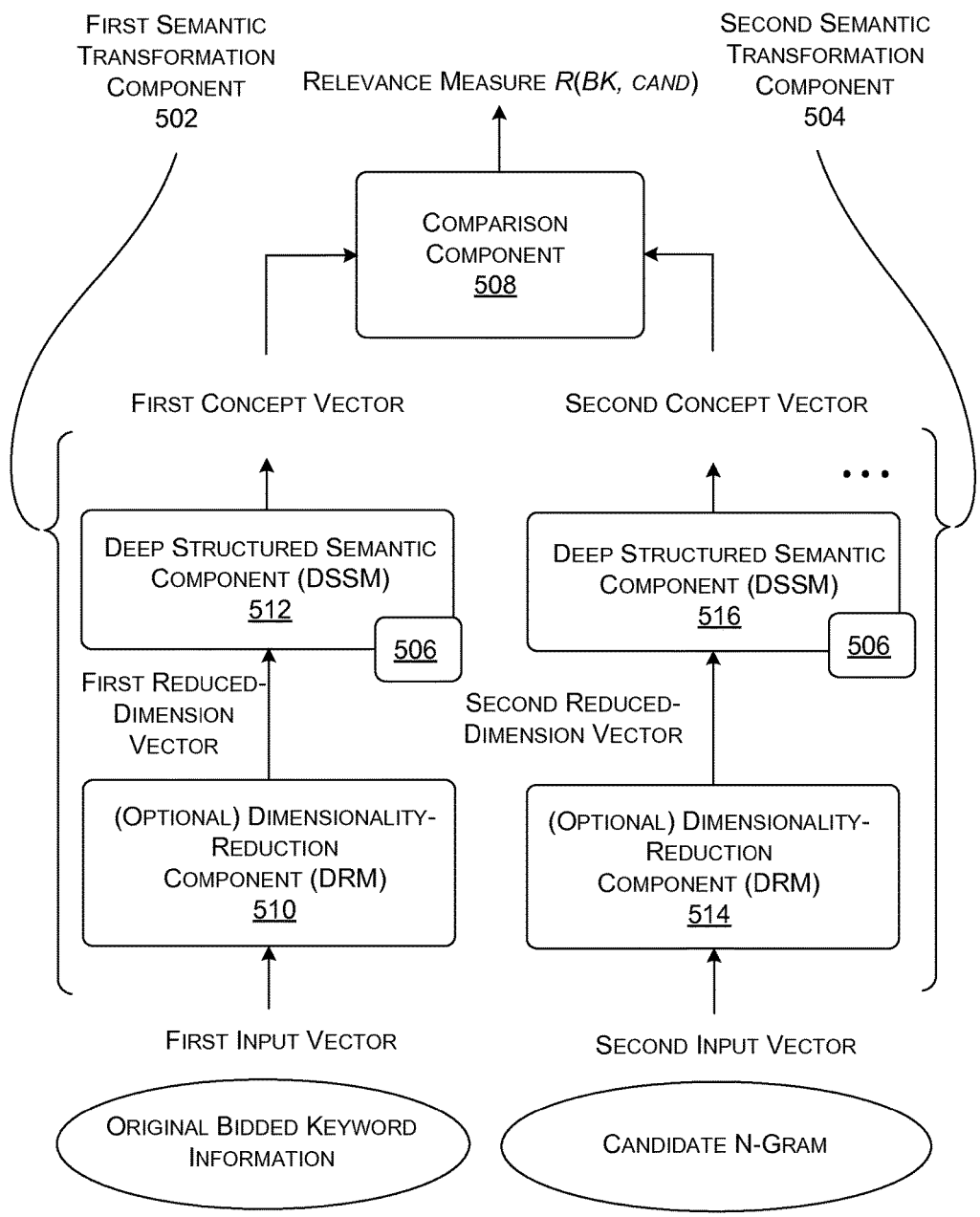
FIGS. 5 and 6 together show one implementation of a scoring component, which is another part of the system of FIG. 1.

FIG. 5 shows one implementation of at least part of the scoring component 226 of FIG. 2. The scoring component 226 is depicted as including two or more instances of a semantic transformation component ("transformation component" for brevity), e.g., a first transformation component 502 and a second transformation component 504, etc. Each transformation component uses an instantiation of the model 506 to map an input vector into an output concept vector. The input vector represents a particular linguistic item, such as an instance of original keyword information or a candidate n-gram. The concept vector is expressed in a semantic space and reveals semantic information regarding the corresponding linguistic item from which it was derived. More generally, a "vector," as that term is used herein, broadly corresponds to any information having two or more elements, associated with respective vector dimensions.

In one case, the scoring component 226 can actually provide two or more separate instances of transformation functionality to implement the plural transformation components (502, 504) shown in FIG. 5. For example, the ranking scoring component 226 can provide two or more physical processing components associated with different instances of transformation functionality. Alternatively, or in addition, the scoring component 226 can provide separate software-implemented instances of transformation functionality. Alternatively, or in addition, the scoring component 226 can use a single instance of the transformation functionality to process separate input linguistic items in series, for example, by projecting a set of linguistic items into the semantic domain, one after the other.

In the particular case of FIG. 5, the first transformation component 502 uses a first instance of the model 506 to project original bidded keyword information to an original bidded keyword (BK) concept vector $y_{BK}$ in the semantic space. The second transformation component 504 uses a second instance of the model 506 to transform a candidate n-gram into a candidate concept vector $y_{cand}$. The BK concept vector captures the underlying semantics of the original keyword information, while the candidate concept vector captures the underlying semantics of the candidate n-gram.

A comparison component 508 can compare each BK concept vector $y_{BK}$ with the candidate concept vector $y_{cand}$, to produce a relevance measure. The relevance measure provides an indication of the extent of a semantic relationship between the two concept vectors. Relevance may be defined in any environment-specific manner; in one case, for instance, the relevance measure describes how close the BK concept vector $y_{BK}$ is to the candidate concept vector $y_{cand}$ within the semantic space. In other words, in one case, the relevance measure indicates the degree of conceptual relatedness of the original keyword information to the candidate n-gram. Two vectors that are close together in the semantic space pertain to the same or related concepts. Two vectors that are far apart in the semantic space refer to dissimilar concepts.

In one implementation, the comparison component 508 can compute the semantic relationship (e.g., similarity) between the two concept vectors ($Y_{KB}$, $y_{cand}$) as a cosine similarity measure, as follows:

$$R(KB, cand) = \text{cosine}(y_{KB}, y_{cand}) = \frac{y_{KB}^T y_{cand}}{\|y_{KB}\|\|y_{cand}\|}. \quad (1)$$

Other comparison techniques can be used instead of the cosine similarity determination technique, such as a Manhattan distance determination technique.

The first transformation component 502 includes an (optional) dimensionality-reduction component (DRM) 510 and a deep-structured semantic component (DSSM) 512. Similarly, the second transformation component 504 includes an optional DRM 514 and a DSSM 516. The DSSMs perform their functions based on respective instances of the deep learning model 506.

Each optional DRM receives an input vector which represents a linguistic item. For example, the DRM 510 receives an input vector which represents the original bidded keyword information, while the DRM 514 receives an input vector that describes the candidate n-gram. The first DRM 510 produces a first reduced-dimension vector, while the second DRM 514 produces a second reduced-dimension vector. A reduced-dimension vector has a reduced dimensionality with respect to its corresponding input vector, while still representing the same information expressed in the input vector.

Consider the operation of the DRM 510; the DRM 514 operates in the same manner. In one implementation, the DRM 510 reduces the dimensionality of its input vector using an n-gram hashing technique. For example, assume that the original bidded keyword information corresponds to the phrase "automotive body shop." The scoring component 226 may initially represent this phase as an input vector having a number of dimensions (entries) equal to all the possible words that can be expressed in a natural language, including the words "automotive," "body," and "shop." The scoring component 226 can set a value of 1 for the entries "automotive," "body," and "shop" in the input vector, and a value of 0 for all other entries in the vector. If a word appears multiple times in the input phrase, then the entry for that word will reflect the number of times that the word appears. In other words, the input vector described above provides a bag-of-words representation of the input phrase; further, the input vector is very sparsely populated.

The DRM 510 reduces the dimensionality of an input vector by first appending dummy tokens (e.g., the token "#") to the beginning and end of the input phrase under consideration, e.g., to produce "#automotivebodyshop#". The DRM 510 can then run an n-letter window over the input phrase to produce a series of n-grams. For example, if n=3, the DRM 510 produces the following sequence of trigrams, "#au", "aut", "uto", "tom", "omo", and so on, until the terminal dummy character is reached. The DRM 510 can then form a reduced-dimension vector having a number of dimensions corresponding to all the possible trigrams in a particular language (with the possible exclusion of some uninteresting trigrams). In that vector, the DRM 510 can set the value of 1 for the trigrams entries that appear in the input phrase, e.g., by setting a 1 value for "#au", a 1 value for "aut," and so on, and a value of 0 for other entries. If a phrase includes multiple occurrences of the same trigram, then the corresponding entry in the reduced-dimension vector will indicate that number of occurrences of the trigram. Overall, there are many less unique trigrams than unique words in a language, so the reduced-dimension vector will have a much smaller dimensionality compared to the input vector.

In another implementation, the DRM 510 can first convert an input phrase into its phonetic representation (e.g., by expressing "cat" as "kat"), and then perform the above-described operations on the phonetic representation of the input phrase. For example, the DRM 510 can run an n-letter window over the phonetic version of the input phrase, and then form a reduced-dimension vector based on the trigrams which appear in the phonetic representation of the phrase.

In other cases, the scoring component 226 can use other techniques to reduce the dimensionality of the input vectors (besides the above n-gram hashing technique), such as a random projection technique. In another case, the scoring component 226 can entirely omit the use of DRMs, meaning that it operates on the original uncompressed input vectors.

Each DSSM projects an input reduced-dimension vector into a concept vector, using the model 506. More specifically, advancing to FIG. 6, this figure shows one implementation of the DSSM 512 of FIG. 5. The DSSM 516 of the second transformation component 504 has a similar construction and manner of operation, but is omitted from FIG. 6 to facilitate explanation.

Figure 6:
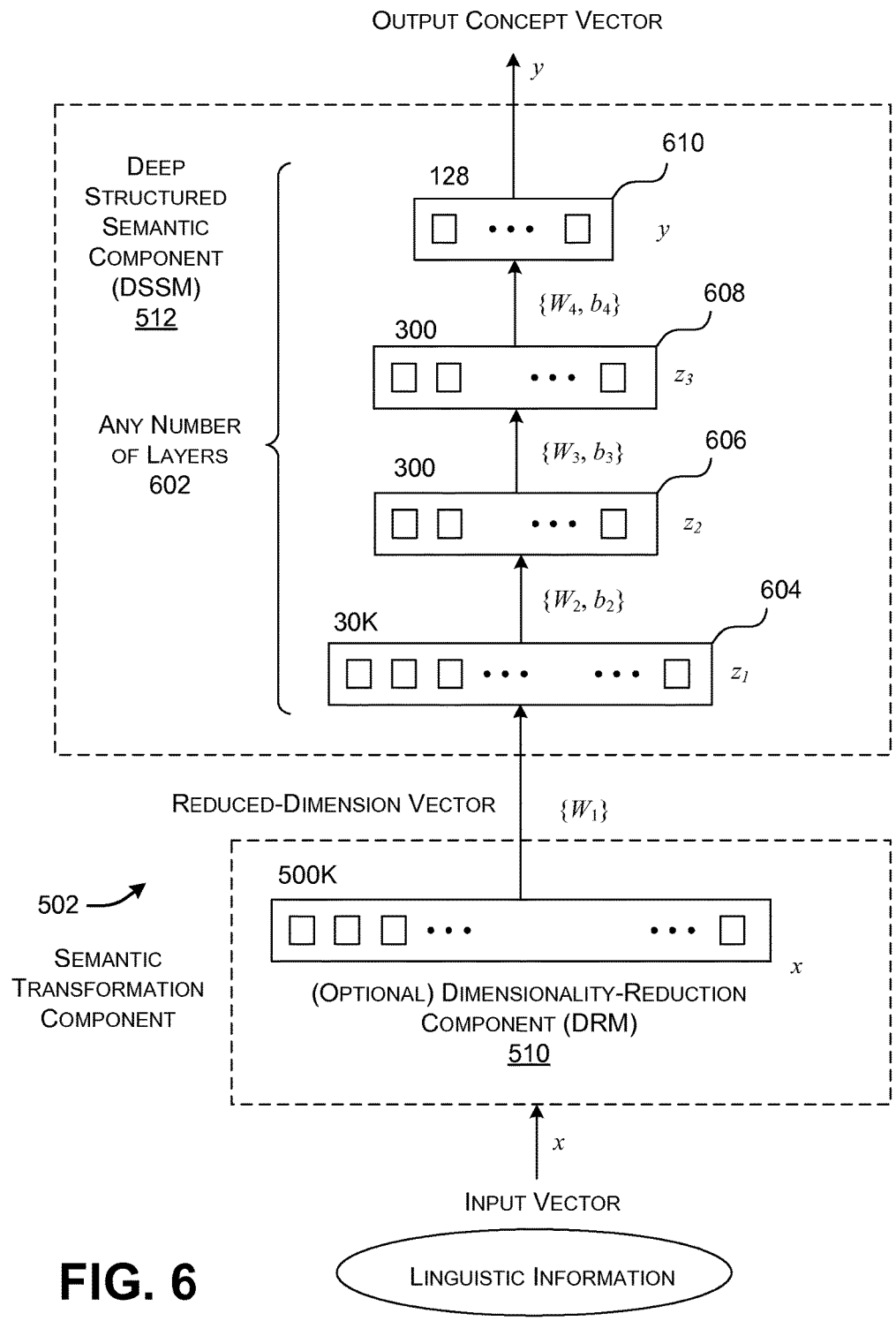

The DSSM 512 may be implemented as a deep-structured neural network (DNN), composed of a plurality of layers 602. FIG. 6 specifically shows that the DSSM 512 includes four layers, but, more generally, the DSSM 512 can include any number of layers. Each layer, in turn, includes a plural of elements, referred to as neurons. Each neuron stores a value. Each neuron, in a given layer, is furthermore connected to zero, one or more neurons in an immediately anterior layer (if any), and zero, one or more neurons in an immediately posterior layer (if any). Here, "anterior" and "posterior" refer to adjacent layers in relation to a direction of information flow through the DNN, which is from bottom to top in FIG. 6. That is, with respect to a given layer, anterior layers represent lower layers, while posterior layers represent higher layers.

The layers 602 include a bottommost layer 604 for storing values, collectively denoted by the vector $z_1$. More specifically, the layer 604 represents the input to the DSSM 512, and therefore stores the values associated with the reduced-dimension vector provided by the DRM 510. A next layer 606 stores a vector $z_2$ having values that are derived from the values in the first layer, associated with the vector $z_1$. A next layer 608 stores a vector $z_3$ having values that are derived from the values in the layer 606, associated with the vector $z_2$. A final output layer 610 stores the concept vector y, having values that are derived from the values in the layer 608, associated with the vector $z_3$.

FIG. 6 also represents the various layers (604, 606, 608, 610) as boxes having different respective lengths to indicate that the different layers have different respective dimensionalities. Without limitation, in one implementation, the input vector x fed to the DRM 510 has a dimensionality of 500K, indicating that there are 500K possible words in an identified vocabulary. The layer 604 has a dimensionality of 30K. For instance, if a trigram hashing technique is used to produce the reduced-dimension vector, then the dimensionality of layer 604 means that there are 30K unique trigrams within the original corpus of 500K words (with the possible exclusion of some uninteresting trigrams). The layer 606 and the layer 608 each have a dimensionality of 300 elements. And the layer 610 has a dimensionality of 128 elements. To repeat, however, another implementation of the DSSM 512 can employ any number of layers, each of which can have any size.

More formally stated, in one implementation, the vector $z_1$ in the layer 604 can be expressed as $z_1 = W_1 x$, where $W_1$ represents whatever transformation is used by the DRM 510 to produce the lower-dimension vector. The vector $z_i$ in layers 606 and 608 may be expressed as $z_i = f(W_i z_{i-1} + b_i)$, for $i=2, \ldots N-1$. And the vector y in the layer 610 may be expressed as $y = f(W_N z_{N-1} + b_N)$, where, in the specific example of FIG. 6, N=4. The symbol $W_i$ denotes the i-th weighting matrix produced by a training system (to be described below), and the symbol $b_i$ refers to an optional i-th bias term, also produced by the training system. The function $f(x)$, referred to as the activation function, can be formulated in different ways, such as the following tan h function:

$$f(x) = \frac{1 - e^{-2x}}{1 + e^{-2x}}. \quad (2)$$

Figure 7:
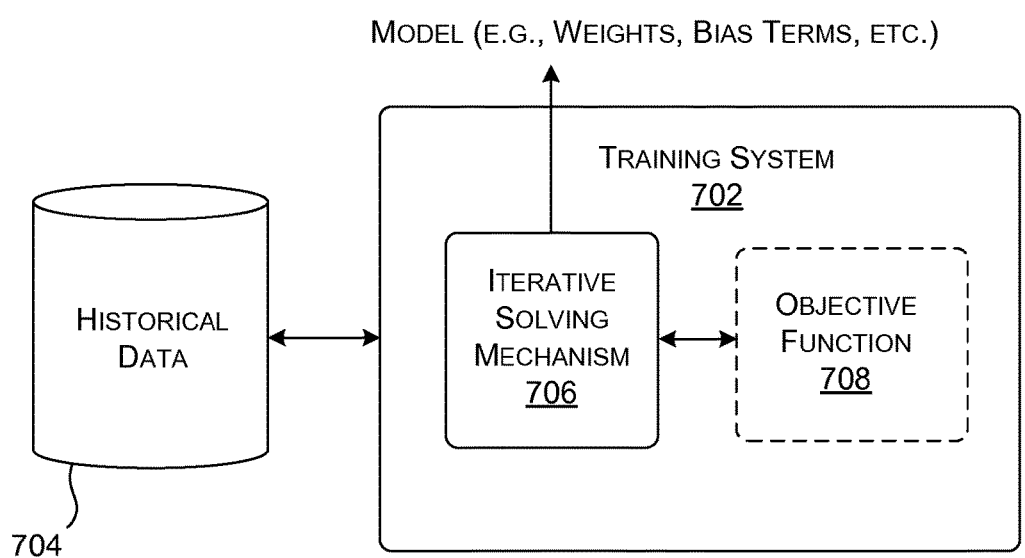
FIG. 7 shows a training system for producing a model for use by the scoring component of FIGS. 5 and 6.

FIG. 7 shows one implementation of a training system 702 that can be used to produce the model 506 used by the scoring component 226, based on a corpus of historical data (provided in a data store 704). The model 506 represents the collection of weighting matrixes ($W_i$) and bias factors ($b_i$) shown in FIG. 6, collectively represented by the symbol A.

The historical data may represent any empirical information that has a bearing on the relationship between the original bidded keyword information and rewritten keyword information. In some implementations, the historical data can include <original keyword information, rewritten keyword information> pairings. The original keyword information represents an instance of original keyword information chosen by an advertiser. The rewritten keyword information represents an instance of rewritten keyword information for the original keyword information, e.g., as chosen in a manual manner by a human rewriter, or chosen by the keyword rewriting component 106. A positive example in the historical data constitutes a case in which a human evaluator (and/or an automated tool) has judged the rewritten keyword information to be an accurate replacement for the original keyword information. A negative example constitutes a case in which a human evaluator (and/or an automated tool) has judged the rewritten keyword information to be a poor replacement for the original keyword information. One type of automated tool that can be used to make this evaluation (instead of a human evaluator) leverages clicks associated with ads having rewritten keyword information associated therewith; if an ad having rewritten keyword information receives a prescribed number of clicks, it is considered as having good rewritten keyword information; otherwise, it is bad.

Alternatively, the historical data can use any type of proxy parings, besides the above-described <original keyword information, rewritten keyword information> pairings. For example, the historical data may represent <query, keyword information> pairings. For each pairing, the query may represent a query that at least one user has submitted to a search engine. For a positive example, the keyword information in the pairing may represent the bidded keyword information associated with an ad that users have generally clicked on (or otherwise selected) in response to submitting the query. For a negative example, the keyword information may represent the bidded keyword information associated with an ad that the users generally did not click on. The assumption here is that the relationship between queries and clicked-on keyword information is relevant to the relationship between instances of rewritten keyword information and instances of original keyword information.

The training system 702 operates by using a solving mechanism 706 to iteratively achieve an objective defined an objective function 708, by iteratively changing the parameter values of the model. When the iterative processing is finished, the final parameter values constitute the trained model. The objective function 708, in turn, mathematically expresses an aim which the model seeks to achieve, when fully trained. In the present case, the objective function stipulates that the conditional likelihood of successful (e.g., clicked on) instances of rewritten keyword information, given respective instances of original keyword information, is to be maximized, and the conditional likelihood of unsuccessful (e.g., not clicked on) instances of rewritten keyword information, given the instances of original keyword information, is to be reduced.

More specifically, consider the illustrative case in which a training subset includes an instance of original keyword information (Q), an instance of rewritten keyword information ($D^+$) that is considered relevant to Q, and at least one instance of rewritten keyword information ($D^-$) that is not considered relevant to Q. For example, the subset can include four instances of rewritten keyword information $\{D_2^-, D_3^-, D_4^-, D_5^-\}$, but a training subset can include any number of such instances.

To mathematically derive the objective function, first note that the probability P (D|Q) of a relevant instance of rewritten keyword information ($D^+$) in a training subset, given an original instance of keyword information Q, can first be expressed as a softmax function as follows:

$$P(D^+ \mid Q) = \frac{\exp(\psi R_\Lambda(Q, D^+))}{\sum_{D' \in D} \exp(\psi R_\Lambda(Q, D'))}. \quad (3)$$

The term $R_\Lambda(Q, D^+)$ represents the similarity between Q and $D^+$ in the semantic space, for a given current selection of parameters associated with a model $\Lambda$. The term D represents the set of five instances of rewritten keyword information in the training subset, including $D^+$ and the four instances of $D^-$. The term $R_\Lambda(Q, D')$ represents the similarity between Q and one of the instances of rewritten keyword information (D') in the training subset, in the semantic space. The symbol $\psi$ represents an empirically-derived smoothing factor (e.g., which can be generated by analyzing a held-out dataset of training examples). For this individual training subset, the objective function will express an attempt to make $R(Q, D^+)$ as high as possible, and each $R(Q, D^-)$ as low as possible, to overall make $P(D^+|Q)$ as high as possible, and each $P(D^-|Q)$ as low as possible.

Overall, when considering all of the training subsets in the corpus of historical data, the objective function involves attempting to maximize the conditional likelihood of the relevant instances of rewritten keyword information given the original instances of keyword information, or equivalently, minimize the following loss equation:

$$L(\Lambda) = -\log \prod_{(Q,D^+)} P(D^+ \mid Q). \quad (4)$$

In other words, the objective is to derive a set of parameter values that minimizes the above equation, with respect to all of the training subsets in the historical data, or some subset thereof.

In one approach, the iterative solving mechanism 706 uses a gradient-based numerical optimization algorithm to solve the above problem, such as a gradient descent technique. The iterative solving mechanism 902, for instance, can apply the following update rule to perform the optimization:

$$\Lambda_t = \Lambda_{t-1} - \epsilon_t \frac{\partial L(\Lambda)}{\partial \Lambda}\bigg|_{\Lambda=\Lambda_{t-1}}. \quad (5)$$

Here, $\Lambda_t$ and $\Lambda_{t-1}$ are the models at the $t^{th}$ and $t-1^{th}$ iteration, respectively, and $\in_t$ is a learning rate parameter. From a high-level perspective, the iterative solving mechanism 706 makes a large change in the model $\Lambda$ whenever the model $\Lambda$ is changing by a relatively large amount from iteration to iteration, and makes a smaller change in the model $\Lambda$ whenever the model $\Lambda$ is changing by a slower amount.

More specifically, assume that there are M training examples in the historical data. The $m^{th}$ training example is $(Q_m, D_m^+)$, corresponding to a particular pairing of an instance of original keyword information $(Q_m)$ and an instance of rewritten keyword information $(D_m^+)$ that is considered relevant to the instance of original keyword information $Q_m$. The loss function for that individual training example is:

$$L_m(\Lambda) = -\log P(D_m^+ \mid Q_m) \quad (6).$$

The derivative of the loss function as a whole can therefore be expressed as:

$$\frac{\partial L(\Lambda)}{\partial \Lambda} = \sum_{m=1}^{M} \frac{\partial L_m(\Lambda)}{\partial \Lambda}. \quad (7)$$

The term $$\frac{\partial L_m(\Lambda)}{\partial \Lambda}$$

can be derived as follows. To simplify the notation, the subscript m will be omitted in the following. First, the loss function derived above can be expressed as follows:

$$L(\Lambda) = \log\left(1 + \sum_j \exp(-\psi \Delta_j)\right), \quad (8)$$

where $\Delta_j = R(Q, D^+) - R(Q, D_j^-)$. The gradient of the loss function with respect to the $N^{th}$ weight matrix $W_N$ is:

$$\frac{\partial L(\Lambda)}{\partial W_N} = \sum_j \alpha_j \frac{\partial \Delta_j}{\partial W_N}, \quad (9)$$

where:

$$\frac{\partial \Delta_j}{\partial W_N} = \frac{\partial R(Q, D^+)}{\partial W_N} - \frac{\partial R(Q, D_j^-)}{\partial W_N}, \quad (10)$$

and $$\alpha_j = \frac{-\psi \exp(-\psi \Delta_j)}{1 + \sum_{j'} \exp(-\psi \Delta_{j'})}. \quad (11)$$

Now, let $z_{i,Q}$ and $z_{i,D}$ refer to the activation in the hidden layer i for Q and D, respectively. And let $y_Q$ and $y_D$ refer to the output activation for the output layer 410 for Q and D, respectively. Further, to simplify the following notation, let a, b, and c correspond to $y_Q^T y_D$, $1/\|y_Q\|$, and $1/\|y_D\|$, respectively. Finally, assume that the activation function used by the model corresponds to the tan h function described above in Equation (2). With those definitions, each term in the right-hand side of Equation (10) can be calculated for the pair (Q, D) using the following formula:

$$\frac{\partial R(Q, D)}{\partial W_N} = \frac{\partial}{\partial W_N} \frac{y_Q^T y_D}{\|y_Q\| \|y_D\|} = \delta_{y_Q}^{(Q,D)} z_{N-1,Q}^T + \delta_{y_D}^{(Q,D)} z_{N-1,D}^T, \quad (12)$$

where:

$$\delta_{y_Q}^{(Q,D)} = (1 - y_Q) \circ (1 + y_Q) \circ (bc y_D - acb^3 y_Q) \quad (13)$$

and $$\delta_{y_D}^{(Q,D)} = (1 - y_D) \circ (1 + y_D) \circ (bc y_Q - abc^3 y_D). \quad (14)$$

In the above equations, the operation · is an element-wise multiplication (i.e., a Hadamard product).

The values $\{\delta\}$ for each successive hidden layer of the deep neural network can be computed through back projection as follows:

$$\delta_{i,Q}^{(Q,D)} = (1+z_{i,Q}) \cdot (1-z_{i,Q}) \cdot W_i^T \delta_{i+1,Q}^{(Q,D)} \quad (15)$$

and $$\delta_{i,D}^{(Q,D)} = (1+z_{i,D}) \cdot (1-z_{i,D}) \cdot W_i^T \delta_{i+1,D}^{(Q,D)} \quad (16)$$

Correspondingly, the gradient of the loss function with respect to an intermediate weight matrix $W_i$, $i=2, \ldots, N-1$, can be computed as:

$$\frac{\partial L(\Lambda)}{\partial W_i} = \sum_j \alpha_j \frac{\partial \Delta_j}{\partial W_i}, \quad (17)$$

where $$\frac{\partial \Delta_j}{\partial W_i}$$

is equal to:

$$(\delta_{i,Q}^{(Q,D^+)} z_{i-1,Q}^T + \delta_{i,D}^{(Q,D^+)} z_{i-1,D_+}^T) - (\delta_{i,Q}^{(Q,D_j^-)} z_{i-1,Q}^T + \delta_{i,D_j^-}^{(Q,D_j^-)} z_{i-1,D_j^-}^T) \quad (18).$$

The iterative solving mechanism 706 applies the equations set forth herein in successive forward and backward phases of analysis until a desired degree of convergence is achieved, to generate the final set of parameter values defining the model Λ.

B. Illustrative Processes

FIGS. 8-11 show processes that explain the operation of the system 102 of Section A in flowchart form. Since the principles underlying the operation of the system 102 have already been described in Section A, certain operations will be addressed in summary fashion in this section. As noted in the prefatory part of the Detailed Description, the flowcharts are expressed as a series of operations performed in a particular order. But the order of these operations is merely representative, and can be varied in any manner.

Figure 8:
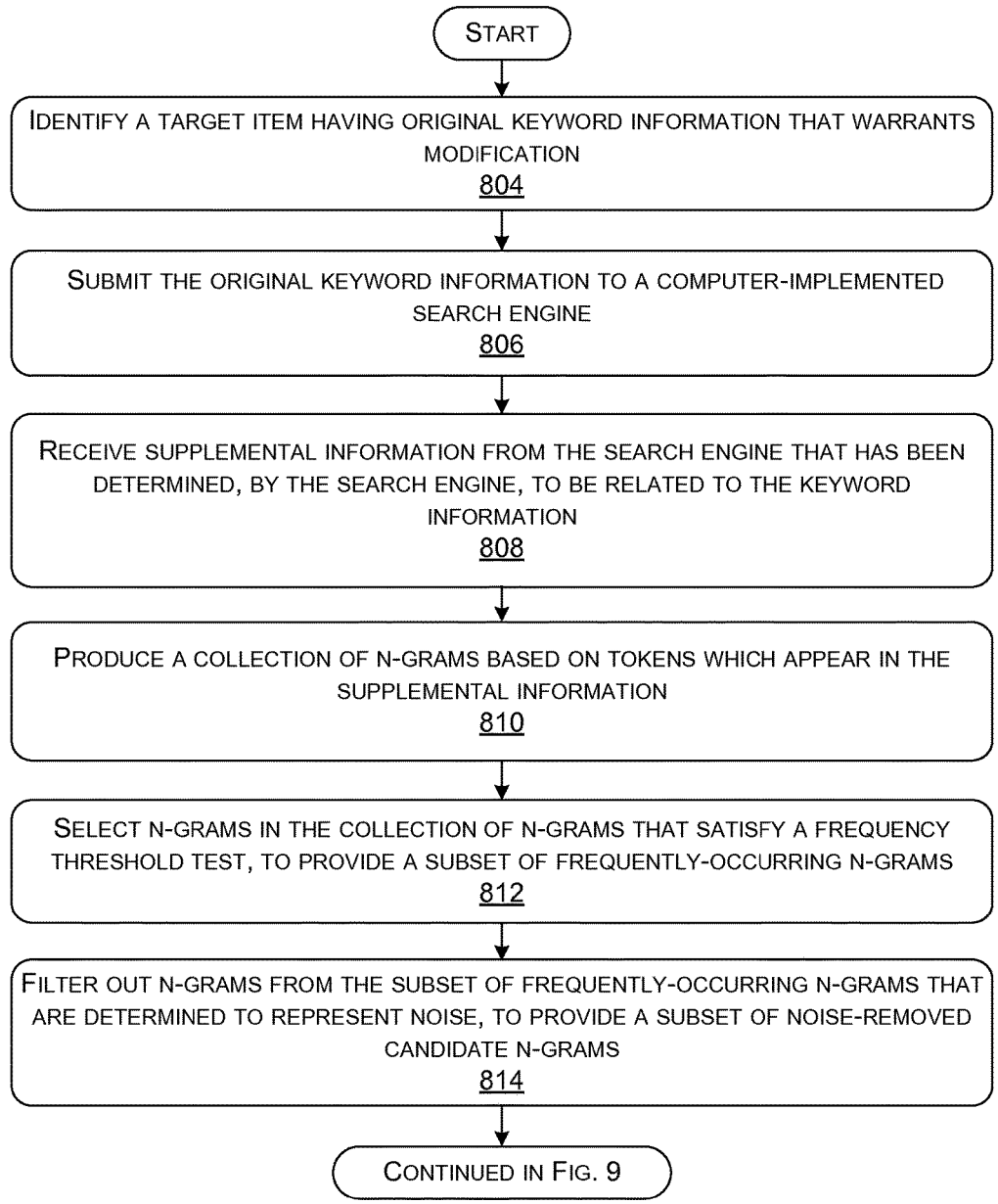
FIGS. 8 and 9 together show a process that represents one manner of operation of the keyword rewriting component of FIG. 2.
Figure 9:
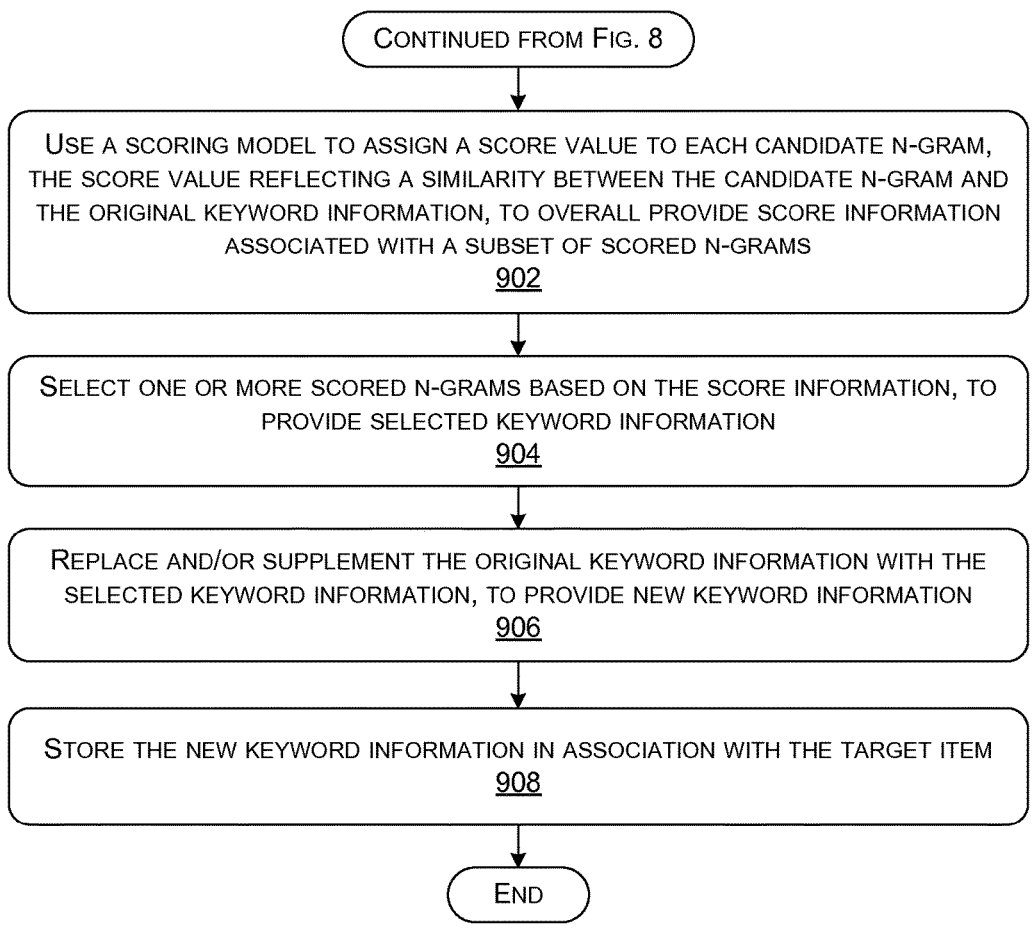

FIGS. 8 and 9 together show a process 802 for modifying keyword information. In block 804 of FIG. 8, the keyword rewriting component 106 identifies a target item having original keyword information that warrants modification. In block 806, keyword rewriting component 106 submits the original keyword information to a computer-implemented search engine. In block 808, the keyword rewriting component 106 receives supplemental information from the search engine that has been determined, by the search engine, to be related to the keyword information. In block 810, the keyword rewriting component 106 produces a collection of n-grams based on tokens which appear in the supplemental information. In block 812, the keyword rewriting component 106 selects n-grams in the collection of n-grams that satisfy a frequency threshold test, to provide a subset of frequently-occurring n-grams. In block 814, the keyword rewriting component 106 filters out n-grams from the subset of frequently-occurring n-grams that are determined to represent noise, to provide a subset of noise-removed candidate n-grams.

Advancing to FIG. 9, in block 902, the keyword rewriting component 106 uses a scoring model to assign a score value to each candidate n-gram, the score value reflecting a similarity between the candidate n-gram and the original keyword information, to overall provide score information associated with a subset of scored n-grams. In block 904, the keyword rewriting component 106 selects one or more scored n-grams based on the score information, to provide selected keyword information. In block 906, the keyword rewriting component 106 replaces and/or supplements the original keyword information with the selected keyword information, to provide new keyword information. In block 908, the keyword rewriting component 106 stores the new keyword information in association with the target item.

Figure 10:
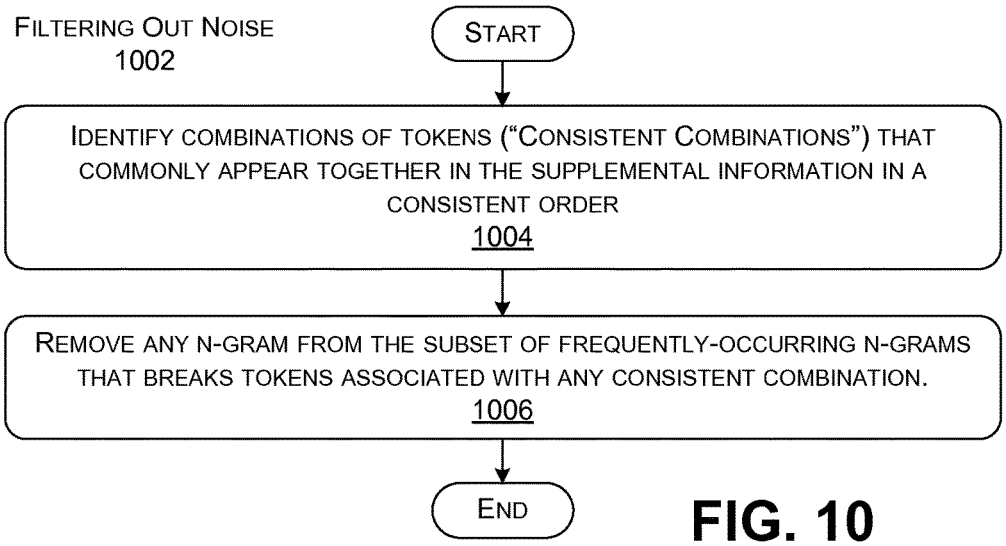
FIG. 10 shows a process that represents one manner of operation of a filtration component, which is another part of the system of FIG. 1.

FIG. 10 shows a process 1002 for filtering out noise. In block 1004, the filtration component 222 identifies combinations of tokens that commonly appear together in the supplemental information in a consistent order, corresponding to consistent combinations. In block 1006, the filtration component 222 removes any n-gram from the subset of frequently-occurring n-grams that breaks tokens associated with any consistent combination.

Figure 11:
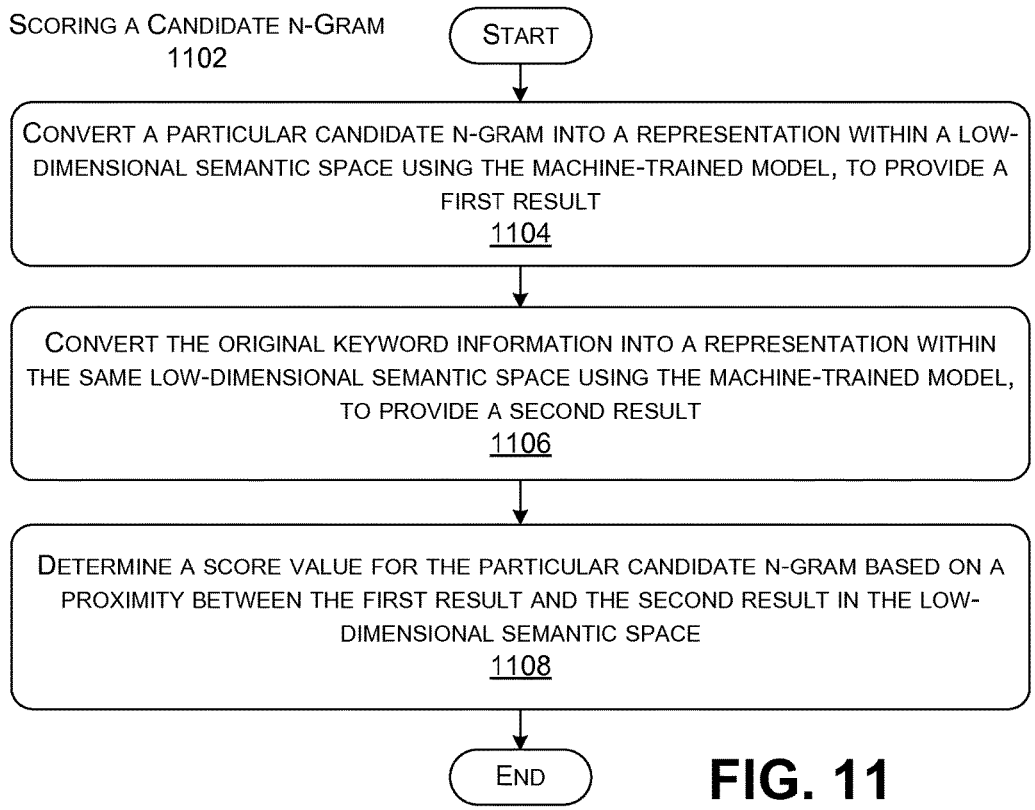
FIG. 11 shows a process that represents one manner of operation of the scoring component of FIGS. 5 and 6.

FIG. 11 shows a process 1102 for scoring a particular candidate n-gram. In block 1104, the scoring component 226 converts the particular candidate n-gram into a representation within a low-dimensional semantic space using the machine-learned model, to provide a first result. In block 1106, the scoring component 226 converts the original keyword information into a representation within the same low-dimensional semantic space using the machine-learned model, to provide a second result. In block 1108, the scoring component 226 determines a score value for the particular candidate n-gram based on a proximity between the first result and the second result in the low-dimensional semantic space.

C. Representative Computing Functionality

Figure 12:
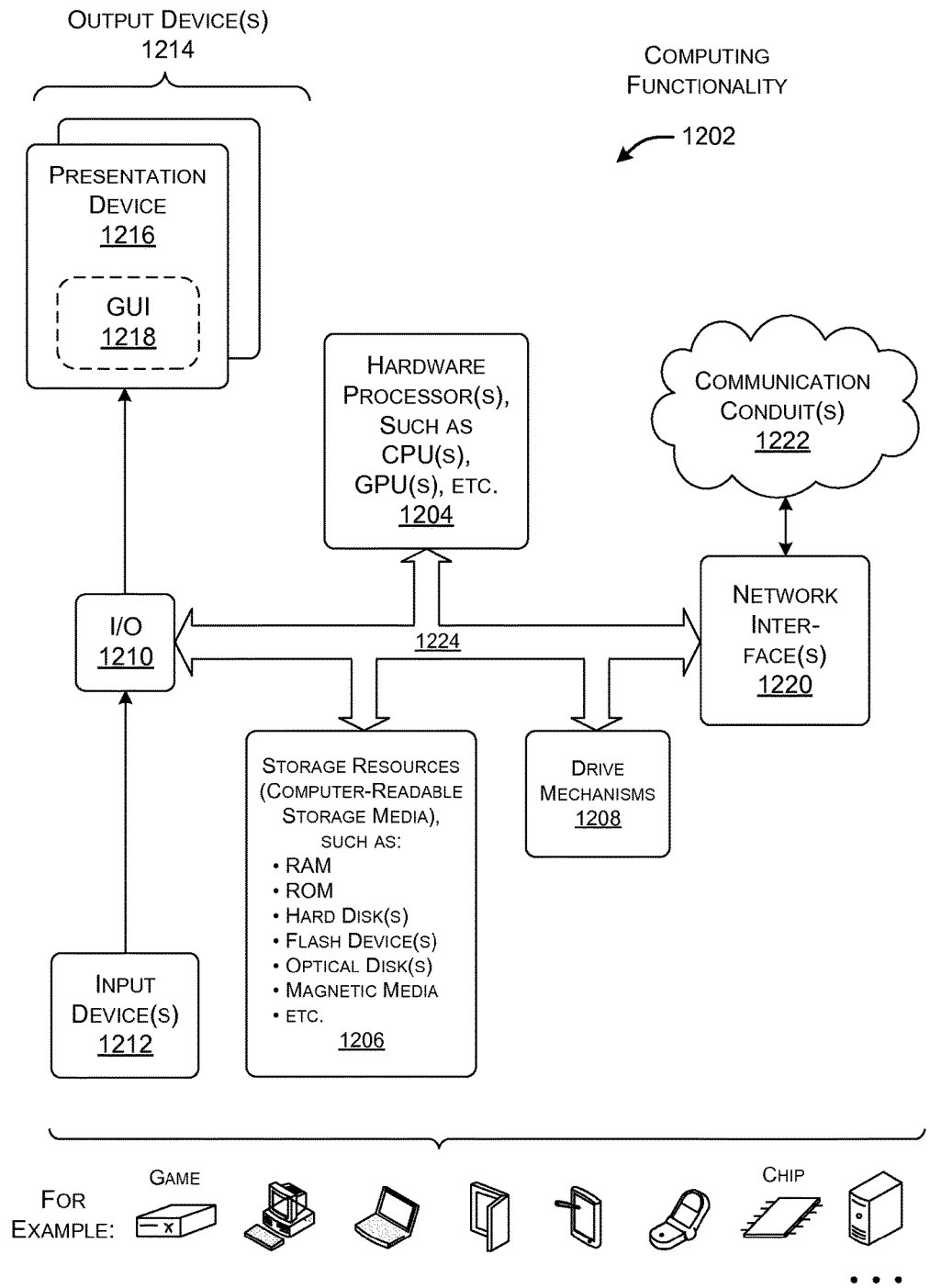
FIG. 12 shows illustrative computing functionality that can be used to implement any aspect of the features shown in the foregoing drawings.

FIG. 12 shows computing functionality 1202 that can be used to implement any aspect of the system 102 set forth in the above-described figures. For instance, the type of computing functionality 1202 shown in FIG. 12 can be used to implement any of the query processing engine 104, the keyword rewriting component 106, the user device 108, etc. In all cases, the computing functionality 1202 represents one or more physical and tangible processing mechanisms.

The computing functionality 1202 can include one or more hardware processors 1204, such as one or more central processing units (CPUs), and/or one or more graphical processing units (GPUs), and so on. The computing functionality 1202 can also include any storage resources (also referred to as computer-readable storage media or computer-readable storage medium devices) 1206 for storing any kind of information, such as machine-readable instructions, settings, data, etc. Without limitation, for instance, the storage resources 1206 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1202. The computing functionality 1202 may perform any of the functions described above when the hardware processor(s) 1204 carry out computer-readable instructions stored in any storage resource or combination of storage resources. The computing functionality 1202 also includes one or more drive mechanisms 1208 for interacting with any storage resource, such as a hard disk drive mechanism, an optical disk drive mechanism, and so on.

The computing functionality 1202 also includes an input/output component 1210 for receiving various inputs (via input devices 1212), and for providing various outputs (via output devices 1214). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1216 and an associated graphical user interface presentation (GUI) 1218. The presentation device 1216 may correspond to a physical monitor (e.g., a charge-coupled display device, a cathode ray tube device, a projection mechanism, etc.). Other output devices include a printer, a model-generating mechanism, a tactile output mechanism, an archival mechanism (for storing output information), and so on. The computing functionality 1202 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area computer network, a wide area computer network (e.g., the Internet), point-to-point connections, etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1202 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions can be embodied in the hardware logic itself.

The following summary provides a non-exhaustive list of illustrative aspects of the technology set forth herein.

According to a first aspect, a method is described herein for modifying keyword information, implemented by at least one hardware processor of one or more computing devices. The method includes: identifying a target item having original keyword information that warrants modification; submitting the original keyword information to a computer-implemented search engine; receiving supplemental information from the search engine that has been determined, by the search engine, to be related to the keyword information; producing a collection of n-grams based on tokens which appear in the supplemental information; selecting n-grams in the collection of n-grams that satisfy a frequency threshold test, to provide a subset of frequently-occurring n-grams; filtering out n-grams from the subset of frequently-occurring n-grams that are determined to represent noise, to provide a subset of noise-removed candidate n-grams; using a scoring model to assign a score value to each candidate n-gram, the score value reflecting a similarity between the candidate n-gram and the original keyword information, to overall provide score information associated with a subset of scored n-grams; selecting one or more scored n-grams based on the score information, to provide selected keyword information; replacing and/or supplementing the original keyword information with the selected keyword information, to provide new keyword information; and storing the new keyword information in association with the target item.

According to a second aspect, the target item corresponds to an ad, and the original keyword information corresponds to bidded keyword information.

According to a third aspect, the above-referenced identifying the target item includes determining an ad having a performance level below a prescribed threshold value.

According to a fourth aspect, the performance level is measured based on a number of impressions associated with the ad and/or a number of user selections of the ad by users.

According to a fifth aspect, the supplemental information includes a plurality of search result snippets returned by the search engine.

According to a sixth aspect, the above-referenced selecting of n-grams includes determining whether to retain a particular n-gram based on: (a) a number of tokens in the particular n-gram; (b) a number of tokens in the original keyword information; (c) a frequency of occurrence of the particular n-gram in the supplemental information; and (d) an indication of whether the frequency of occurrence satisfies a frequency threshold value, the frequency threshold value varying depending on the numbers of tokens identified in (a) and (b).

According to a seventh aspect, the above-referenced filtering out includes: identifying combinations of tokens that commonly appear together in a consistent order, corresponding to consistent combinations; and removing any n-gram from the subset of frequently-occurring n-grams that breaks tokens associated with any consistent combination.

According to an eighth aspect, at least some consistent combinations correspond to respective entity names.

According to a ninth aspect, the above-referenced using a scoring model includes: converting a particular candidate n-gram into a representation within a low-dimensional semantic space using a machine-learned model, to provide a first result; converting the original keyword information into a representation within the same low-dimensional semantic space using the machine-learned model, to provide a second result; and determining a score value for the particular candidate n-gram based on a proximity between the first result and the second result in the low-dimensional semantic space.

According to a tenth aspect, the scoring model is a machine-learned deep-structured neural network.

According to an eleventh aspect, the method further includes: receiving a query from a user device over a computer network; matching the query against instances of keyword information associated with a plurality of target items, including at least the new keyword information that has been generated by the method, to provide one or more selected target items; and sending the selected target item(s) to the user device over the computer network.

According to a twelfth aspect, the above-referenced identifying the target item includes receiving a manual specification by a user, via a user device, of the original keyword information that is associated the target item. The method further includes: sending the selected keyword information generated by the method to the user device as a suggestion for consideration by the user; and performing the above-referenced replacing and/or supplementing contingent on acceptance by the user of the selected keyword information.

A thirteenth aspect corresponds to any combination (e.g., any permutation or subset) of the above-referenced first through twelfth aspects.

A fourteenth aspect corresponds to any device counterpart, system counterpart, means-plus-function counterpart, computer-readable storage medium counterpart, data structure counterpart, article of manufacture counterpart, graphical user interface presentation counterpart, etc. associated with the first through thirteenth aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. A method implemented by at least one hardware processor of one or more computing devices, the method comprising:
   identifying a target item having an original keyword that warrants modification;
   submitting a query having the original keyword to a computer-implemented search engine;
   receiving search results for the query having the original keyword from the computer-implemented search engine, the search results having been determined, by the computer-implemented search engine, to be related to the query having the original keyword;
   processing the search results to identify a new keyword in the search results for the query having the original keyword, the new keyword being a potential replacement or supplement for the original keyword;
   in at least one instance, replacing and/or supplementing the original keyword with the new keyword information identified in the search results for the query having the original keyword; and
   storing the new keyword in association with the target item,
   wherein the processing the search results to identify the new keyword comprises:
      producing a collection of n-grams based at least on tokens which appear in supplemental information occurring in the search results;
      selecting n-grams in the collection of n-grams that satisfy a frequency threshold test, to provide a first subset of frequently-occurring n-grams;
      filtering out n-grams from the first subset of frequently-occurring n-grams that are determined to represent noise, to provide a second subset of candidate n-grams;
      using a scoring model to assign score values to the candidate n-grams of the second subset, the score values reflecting semantic similarities between respective candidate n-grams and the original keyword; and
      based at least on the score values reflecting the semantic similarities between the respective candidate n-grams and the original keyword, selecting a specific candidate n-gram as the new keyword to replace or supplement the original keyword.

2. The method claim 1, wherein the target item corresponds to a target ad, and wherein the original keyword is a bidded keyword information.

3. The method of claim 2, further comprising:
   designating a particular ad as the target ad when the particular ad has a performance level below a prescribed threshold value.

4. The method of claim 3, wherein the performance level is measured based at least on a number of impressions associated with the particular ad and a number of user selections of the particular ad.

5. The method of claim 1, wherein the supplemental information includes a plurality of search result snippets returned by the computer-implemented search engine.

6. The method of claim 1, wherein said selecting of n-grams comprises determining whether to retain a particular n-gram based on at least: (a) a number of tokens in the particular n-gram; (b) a number of tokens in the original keyword; (c) a frequency of occurrence of the particular n-gram in the supplemental information; and (d) an indication of whether the frequency of occurrence satisfies a frequency threshold value, the frequency threshold value varying depending on the numbers of tokens identified in (a) and (b).

7. The method of claim 1, wherein said filtering out comprises:
   identifying combinations of tokens that commonly appear together in a consistent order, corresponding to consistent combinations; and
   removing any n-gram from the first subset of frequently-occurring n-grams that breaks tokens associated with any consistent combination.

8. The method of claim 7, wherein at least some consistent combinations correspond to respective entity names.

9. The method of claim 1, wherein said using a scoring model comprises:
   converting a particular candidate n-gram into a representation within a low-dimensional semantic space using a machine-learned model, to provide a first result;
   converting the original keyword into a representation within the same low-dimensional semantic space using the machine-learned model, to provide a second result; and
   determining a particular score value for the particular candidate n-gram based at least on a proximity between the first result and the second result in the low-dimensional semantic space.

10. The method of claim 1, wherein the scoring model comprises a machine-learned deep-structured neural network.

11. The method of claim 1, further comprising:
    receiving a subsequent query from a user device over a computer network;
    matching the subsequent query against instances of keywords associated with a plurality of target items, including at least the new keyword that has been generated by the method, to provide one or more selected target items that include at least the target item having the original keyword; and
    sending said one or more selected target items to the user device over the computer network.

12. The method of claim 1,
    wherein said identifying the target item comprises receiving a manual specification by a user, via a user device, of the original keyword that is associated the target item, and
    wherein the method further comprises:
       sending selected keywords identified using the score values to the user device as suggested keywords; and performing said replacing and/or supplementing contingent on acceptance of a particular suggested keyword as the new keyword.

13. A system, comprising:
a hardware processor; and
a storage resource storing machine-readable instructions which, when executed by the hardware processor, cause the hardware processor to:
identify a target item having a performance level below a prescribed threshold value, the target item being associated with an original keyword;
query a computer-implemented search engine with the original keyword;
receive search results from the computer-implemented search engine that have been determined, by the computer-implemented search engine, to be related to the original keyword;
process the search results to identify a new keyword in the search results received from the computer-implemented search engine, the new keyword being a potential replacement or supplement for the original keyword;
replace and/or supplement the original keyword with the new keyword by associating the new keyword with the target item,
wherein the search results are processed by:
producing a collection of n-grams based at least on tokens which appear in supplemental information occurring in the search results;
selecting n-grams in the collection of n-grams that satisfy a frequency threshold test, to provide a subset of frequently-occurring n-grams;
removing n-grams from the subset of frequently-occurring n-grams that are determined to represent noise, to provide a set of noise-removed candidate n-grams;
using a machine-learned model to assign score values to the noise-removed candidate n-grams, the score values reflecting semantic similarities between respective noise-removed candidate n-grams and the original keyword; and
based at least on the score values reflecting the semantic similarities between the respective noise-removed candidate n-grams and the original keyword, selecting a specific noise-removed candidate n-gram as the new keyword to replace or supplement the original keyword.

14. The system of claim 13, wherein the machine-readable instructions, when executed by the hardware processor, cause the hardware processor to:
determine whether to retain a particular n-gram based at least on: (a) a number of tokens in the particular n-gram; (b) a number of tokens in the original keyword; (c) a frequency of occurrence of the particular n-gram in the supplemental information; and (d) an indication of whether the frequency of occurrence satisfies a frequency threshold value, the frequency threshold value varying depending on the numbers of tokens identified in (a) and (b).

15. The system of claim 13, wherein the machine-readable instructions, when executed by the hardware processor, cause the hardware processor to:
identify combinations of tokens that commonly appear together in a consistent order, corresponding to consistent combinations; and
remove any n-gram from the subset of frequently-occurring n-grams that breaks tokens associated with any consistent combination.

16. The system of claim 15, wherein the machine-readable instructions, when executed by the hardware processor, cause the hardware processor to:
identify tokens that commonly appear together in a consistent order by determining whether the tokens commonly appear together in the supplemental information in a consistent order.

17. The system of claim 13, wherein the machine-readable instructions, when executed by the hardware processor, cause the hardware processor to:
convert a particular candidate n-gram into a representation within a low-dimensional semantic space using the machine-learned model, to provide a first result;
convert the original keyword into a representation within the same low-dimensional semantic space using the machine-learned model, to provide a second result; and
determine a particular score value for the particular candidate n-gram based at least on a proximity between the first result and the second result in the low-dimensional semantic space.

18. A computer-readable storage medium storing computer-readable instructions, the computer-readable instructions performing operations when executed by one or more hardware processing devices, the operations comprising:
submitting an original keyword to a computer-implemented search engine;
receiving search results from the computer-implemented search engine that are determined, by the computer-implemented search engine, to be related to the original keyword;
processing the search results to identify a new keyword in the search results that is a potential replacement or supplement for the original keyword, the processing comprising:
producing a collection of search result n-grams based at least on tokens which appear in the search results;
converting the search result n-grams into search result n-gram representations within a low-dimensional semantic space using a machine-learned model;
converting the original keyword into an original keyword representation within the same low-dimensional semantic space using the machine-learned model;
determining respective semantic similarity scores for the search result n-grams based at least on proximity between the search result n-gram representations and the original keyword representation in the low-dimensional semantic space; and
based at least on the respective semantic similarity scores, selecting a specific search-result n-pram as the new keyword to replace and/or supplement the original keyword; and
replacing and/or supplementing the original keyword with the new keyword.

19. The computer-readable storage medium of claim 18, the operations further comprising:
selecting the search result n-grams by determining whether to retain a particular search result n-gram based at least on: (a) a number of tokens in the particular search result n-gram; (b) a number of tokens in the original keyword; (c) a frequency of occurrence of the particular search result n-gram in the search results; and (d) an indication of whether the frequency of occurrence satisfies a frequency threshold value, the frequency threshold value varying depending on the numbers of tokens identified in (a) and (b).

20. The computer-readable storage medium of claim 18, the operations further comprising:
- identifying combinations of tokens that commonly appear together in the search results in a consistent order, corresponding to consistent combinations; and
- removing, from consideration as a new keyword, at least one search result n-gram that breaks tokens in at least one consistent combination.

* * * * *